US011593829B1

(12) United States Patent
Le et al.

(10) Patent No.: US 11,593,829 B1
(45) Date of Patent: Feb. 28, 2023

(54) PROXY OBJECTS FOR TRACKING PROCESSING OF ELECTRONIC COUPON CODES

(71) Applicant: PayPal, Inc., San Jose, CA (US)

(72) Inventors: Anthony Le, Irvine, CA (US); Taylor James Harwood, Pasadena, CA (US); Jonathan Travis Huff, Los Angeles, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/562,630

(22) Filed: Dec. 27, 2021

(51) Int. Cl.
*G06Q 30/02* (2012.01)
*H04L 67/02* (2022.01)
*G06Q 30/0207* (2023.01)

(52) U.S. Cl.
CPC ..... *G06Q 30/0222* (2013.01); *G06Q 30/0225* (2013.01); *G06Q 30/0239* (2013.01); *H04L 67/02* (2013.01)

(58) Field of Classification Search
CPC .......... G06Q 30/0222; G06Q 30/0225; G06Q 30/0239; H04L 67/02
See application file for complete search history.

(56) References Cited

U.S. PATENT DOCUMENTS

| | | | | |
|---|---|---|---|---|
| 9,843,490 | B2* | 12/2017 | Burch | H04L 43/08 |
| 10,460,015 | B1* | 10/2019 | Totale | G06F 16/958 |
| 2012/0272221 | A1* | 10/2012 | Pessoa | G06F 9/4492 |
| | | | | 717/127 |
| 2013/0060915 | A1* | 3/2013 | Crook | G06F 16/2308 |
| | | | | 709/219 |
| 2014/0373093 | A1* | 12/2014 | Wood | H04L 63/105 |
| | | | | 726/3 |
| 2020/0334701 | A1* | 10/2020 | Henderson | G06Q 30/0222 |

* cited by examiner

*Primary Examiner* — Ilana L Spar
*Assistant Examiner* — Allan J Woodworth, II
(74) *Attorney, Agent, or Firm* — Greenberg Traurig, LLP

(57) ABSTRACT

Systems/techniques for facilitating proxy objects for tracking processing of electronic coupon codes are provided. In various embodiments, a system can determine that a browser is performing a checkout on a frontend website. In various aspects, the system can cause the frontend website to instruct the web browser to transmit a validation request to a backend server, wherein the validation request identifies a coupon code and requests that the backend server determine whether the coupon code is applicable to the checkout. In various instances, the system can cause the web browser to append a proxy object to the validation request, wherein the proxy object fetches, during execution of the validation request by the backend server, an execution status of the validation request. In various cases, the system can receive, from the proxy object, the execution status and can initiate one or more electronic actions based on the execution status.

20 Claims, 8 Drawing Sheets

PROXY OBJECTS FOR TRACKING PROCESSING OF ELECTRONIC COUPON CODES

TECHNICAL FIELD

The subject disclosure relates generally to electronic coupon codes, and more specifically to systems and/or techniques that can facilitate proxy objects for tracking processing of electronic coupon codes.

BACKGROUND

A web browser can engage in an electronic transaction with an e-commerce website. During a checkout of such electronic transaction, the web browser can attempt to apply multiple electronic coupon codes to the electronic transaction, so as to obtain a discounted price. When the web browser attempts to apply a given electronic coupon code, the e-commerce website causes the web browser to transmit the given electronic coupon code to a backend server for validation, and the backend server eventually returns a validation result. However, there is often a time delay between when the backend server finishes processing the validation request and when the backend server returns the validation result to the web browser. Accordingly, it can be difficult for the web browser to know when it should attempt to apply a next electronic coupon code.

When some existing techniques are implemented, the web browser waits to apply the next electronic coupon code until after an arbitrary time interval elapses. Unfortunately, such existing techniques run the risk of not waiting long enough before attempting to apply the next electronic coupon code. When other existing techniques are implemented, the web browser waits to apply the next electronic coupon code until after the validation result is returned by the backend server. Unfortunately, such existing techniques run the risk of waiting longer than necessary before attempting to apply the next electronic coupon code.

Accordingly, systems and/or techniques that can address one or more of these technical problems can be desirable.

DETAILED DESCRIPTION

Figure 1:
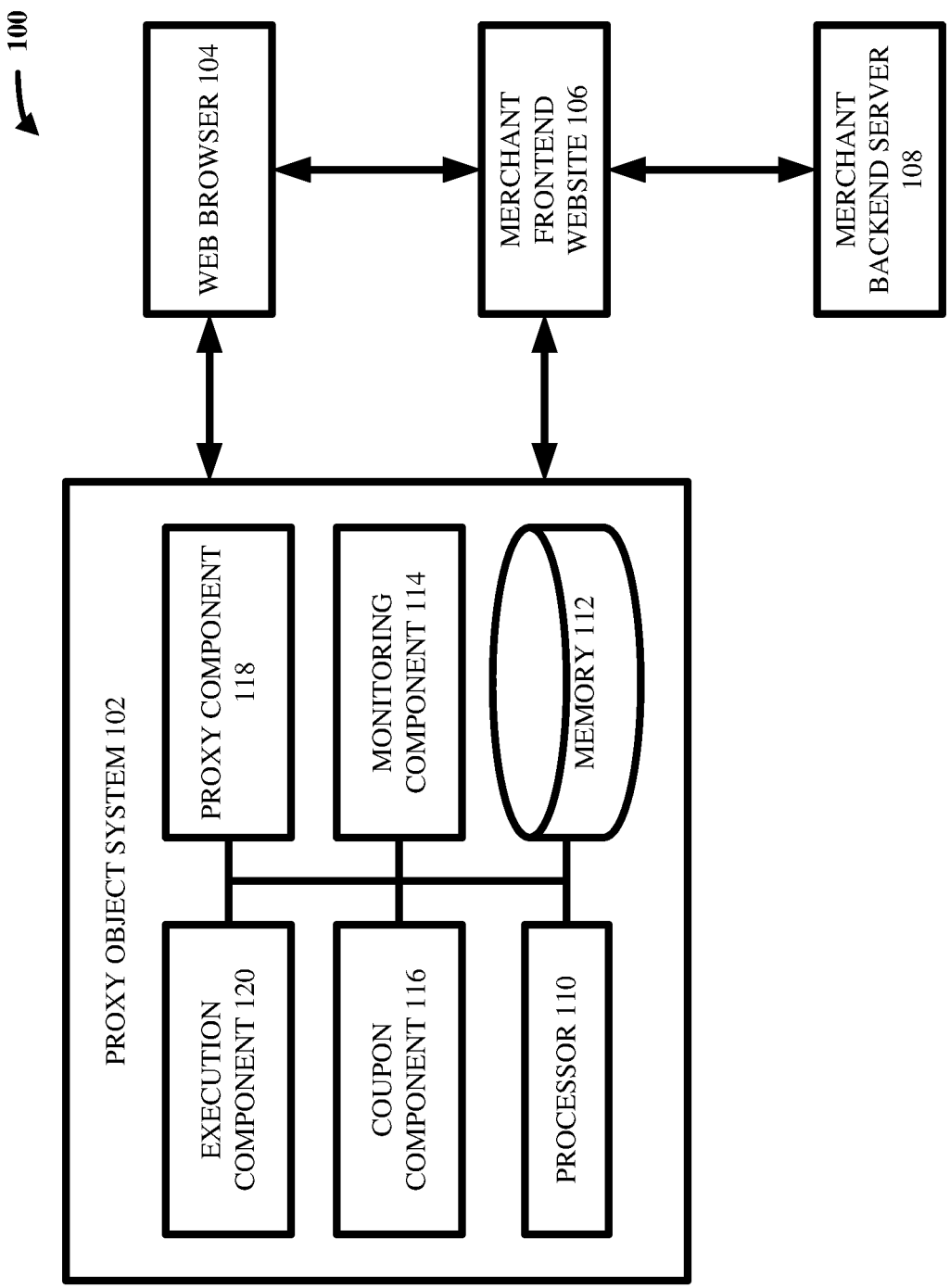
FIG. 1 illustrates a high-level block diagram of an example, non-limiting system that facilitates proxy objects for tracking processing of electronic coupon codes in accordance with one or more embodiments described herein.

The following detailed description is merely illustrative and is not intended to limit embodiments and/or application or uses of embodiments. Furthermore, there is no intention to be bound by any expressed or implied information presented in the preceding Background section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A web browser (e.g., Chrome®, Firefox®, Internet Explorer®, Safari®) can engage in an electronic transaction with an e-commerce website. For example, the e-commerce website can electronically offer a product and/or service for sale, the web browser can electronically visit the e-commerce website by utilizing a uniform resource locator (URL) of the e-commerce website, and the web browser can electronically select and/or click on any suitable invocable user-interface elements of the e-commerce website (e.g., a "buy now" button, an "add to cart" button, a "proceed to checkout" button) so as to initiate an online purchase of the product/service.

During a checkout phase of such electronic transaction, the web browser can attempt to sequentially apply multiple electronic coupon codes to the electronic transaction, so as to obtain a discounted price. More specifically, for any given electronic coupon code, the web browser can electronically type and/or enter the given electronic coupon code into a suitable text field of the e-commerce website, and the web browser can electronically select and/or click on any suitable invocable user-interface element of the e-commerce website (e.g., an "apply coupon code" button, a "verify coupon code" button) so as to attempt to apply the given electronic coupon code to the electronic transaction. This can cause the e-commerce website to instruct the web browser to transmit the given electronic coupon code to a backend server for validation. The backend server can process and/or verify whether the given electronic coupon code is applicable to the electronic transaction, and the backend server can eventually return a validation result to the web browser. However, there can be a time delay between when the backend server finishes processing the validation request and when the backend server returns the validation result to the web browser. Accordingly, it can be difficult for the web browser to know when it should attempt to apply a next electronic coupon code to the electronic transaction.

When some existing techniques are implemented, the web browser waits to apply the next electronic coupon code until after an arbitrary time interval elapses (e.g., the web browser can attempt a new electronic coupon code every 3 seconds). Unfortunately, such existing techniques run the risk of not waiting long enough before attempting to apply the next electronic coupon code (e.g., if the web browser tries a new coupon code every 3 seconds, and if it takes longer than 3 seconds for the backend server to fully process a previous coupon code, the backend server can become overloaded/sluggish and/or can cancel processing/execution of the current/previous coupon code). When other existing techniques are implemented, the web browser waits to apply the next electronic coupon code until after the validation result is returned by the backend server (e.g., the web browser can enter a first coupon code; the backend server can process the first coupon code; the backend server can, after a delay, return a result for the first coupon code back to the web browser; and the web browser can then enter a second coupon code). Unfortunately, such existing techniques run the risk of waiting longer than necessary before attempting to apply the next electronic coupon code (e.g., the backend server can be able to handle a new coupon code after a previous coupon code has been fully processed and before the validation result for such previous coupon code has been returned to the web browser). In any case, existing techniques for entering electronic coupon codes suffer from timing problems.

Accordingly, systems and/or techniques that can address one or more of these technical problems can be desirable.

Various embodiments described herein can address one or more of these technical problems. One or more embodiments described herein include systems, computer-implemented methods, apparatus, and/or computer program products that can facilitate proxy objects for tracking processing of electronic coupon codes. More specifically, various embodiments described herein can be considered as a computerized tool (e.g., any suitable combination of computer-executable hardware and/or computer-executable software) that can electronically leverage proxy objects so as to track the processing status of an entered electronic coupon code, and thus so as to determine when a next electronic coupon code should be entered and/or attempted.

In various embodiments, the computerized tool described herein can include a monitoring component, a coupon component, a proxy component, and/or an execution component.

In various embodiments, there can be a web browser that is participating in an electronic transaction with a merchant frontend website. In various aspects, the web browser can be any suitable web browser that can electronically visit, render, and/or otherwise interact with webpages (and/or with any other suitable electronic resources) on any suitable electronic network (e.g., the Internet). In various instances, the merchant frontend website can be any suitable electronic website on any suitable electronic network (e.g., the Internet) that can offer any suitable products and/or services for sale. Furthermore, there can be a merchant backend server that is associated with the merchant frontend website. In various cases, the merchant backend server can be any suitable computing server that can perform any suitable computerized processing and/or any suitable computations for the merchant frontend website. For example, in some instances, the merchant frontend website can identify an electronic coupon code, and the merchant backend server can process and/or verify whether the identified electronic coupon code is applicable and/or acceptable.

In any case, a user (e.g., human and/or otherwise) of the web browser can desire to apply one or more electronic coupon codes to the electronic transaction so as to obtain a discounted price with respect to the product/service. In various instances, the computerized tool described herein can leverage proxy objects so as to determine when such one or more electronic coupon codes should be attempted to be applied.

In various embodiments, the monitoring component of the computerized tool can electronically determine that the web browser is participating in a checkout of the electronic transaction (e.g., also referred to as an electronic transaction checkout) with and/or on the merchant frontend website. More specifically, the monitoring component can electronically monitor and/or otherwise electronically track the browsing activity and/or browsing behavior of the web browser. That is, the monitoring component can know which webpages of the merchant frontend website and/or which invocable user-interface elements of the merchant frontend website the web browser has visited and/or interacted with. For example, the monitoring component can determine whether the web browser has visited a "checkout" webpage of the merchant frontend website. As another example, the monitoring component can determine whether the web browser has clicked on a "proceed to checkout" button of the merchant frontend website. In any case, the monitoring component can become aware that the web browser is performing the electronic transaction checkout with and/or on the merchant frontend website. In some aspects, the monitoring component can further identify and/or become aware of any suitable characteristics of the electronic transaction checkout, such as a product/service involved in the electronic transaction checkout, a current price of the product/service, a quantity of the product/service, a date and/or time of the electronic transaction checkout, and/or geographic locations (e.g., countries, states, cities, addresses) associated with IP addresses of the web browser and/or of the merchant frontend website.

In various embodiments, the coupon component of the computerized tool can electronically identify a plurality of electronic coupon codes based on the electronic transaction checkout. More specifically, the coupon component can search and/or query any suitable database, whether centralized and/or decentralized, and/or whether publicly-available and/or privately-available, for coupon codes that might be applicable to the electronic transaction checkout. For example, in some instances, the monitoring component can identify one or more characteristics of the electronic transaction checkout (e.g., product/service involved in the electronic transaction checkout, current price of the product/service, quantity of the product/service, date/time of the electronic transaction checkout, geographic locations associated with the electronic transaction checkout), and the coupon component can search the database for any coupon codes that correspond to and/or that otherwise purport to correspond to such one or more characteristics of the electronic transaction checkout. In various cases, the coupon codes that are identified by the coupon component as corresponding to and/or purportedly corresponding to the one or more characteristics of the electronic transaction checkout can be considered as the plurality of electronic coupon codes. In various instances, each of the plurality of electronic coupon codes can correspond to a unique transaction discount and/or to a unique transaction reward (e.g., a first coupon code can correspond to a first discount percentage, a second coupon code can correspond to a second discount percentage, a third coupon code can correspond to free shipping).

In various aspects, the coupon component can further electronically select any one of the plurality of electronic coupon codes, thereby yielding a selected coupon code. In various instances, the coupon component can randomly select the selected coupon code from the plurality of electronic coupon codes. In various other instances, the coupon component can select the selected coupon code from the plurality of electronic coupon codes based on discount (e.g., the selected coupon code can correspond to a highest discount amount and/or to a highest discount percentage that is available in the plurality of electronic coupon codes). In yet other instances, any other suitable selection order and/or selection criteria can be implemented.

In various embodiments, the proxy component of the computerized tool can electronically cause a validation request that is based on the selected coupon code to be transmitted to the merchant backend server for processing/validation. In various aspects, the validation request can be any suitable electronic message (e.g., can be a hyper-text transfer protocol (HTTP) request) that identifies the selected coupon code and/or that requests the merchant backend server to electronically verify whether the selected coupon code is applicable to the electronic transaction checkout. As a non-limiting example, the merchant frontend website can include a text field in which potentially applicable coupon codes can be entered and can further include any suitable invocable user-interface element (e.g., a "verify coupon code" button) that, when invoked, causes the merchant frontend website to instruct and/or command the web browser to generate and/or transmit a validation request for the contents of the text field. Accordingly, in various cases, the proxy component can instruct and/or command the web browser to electronically type and/or copy-and-paste the selected coupon code into the text field of the merchant frontend website, and the proxy component can instruct and/or command the web browser to electronically click on the invocable user-interface element associated with the text field. This can cause the merchant frontend website to instruct and/or command the web browser to transmit the validation request to the merchant backend server.

Furthermore, in various instances, the proxy component can electronically cause a proxy object to become appended to the validation request. For example, in some cases, the validation request can be one or more executable lines of computer code (e.g., such as an HTTP request comprising a request line, one or more headers, and/or a message body), and the proxy object can also be one or more executable lines of computer code (e.g., JavaScript) that can be inserted into the validation request and/or that can be wrapped around the validation request. In various aspects, and as those having ordinary skill in the art will appreciate, the contents of the validation request can depend upon any suitable application programming interfaces (APIs) of the web browser (e.g., can depend upon the fetch APIs of the web browser, can depend upon the XmlHttpRequest APIs of the web browser). Accordingly, in various instances, the proxy component can electronically alter and/or modify one or more APIs of the web browser (e.g., the web browser's fetch APIs and/or XmlHttpRequest APIs), where such API alteration and/or modification can cause the web browser to insert a proxy object into and/or otherwise wrap a proxy object around any web request that the web browser generates and/or transmits. So, when the merchant frontend website instructs/commands the web browser to generate and transmit the validation request to the merchant backend server, the web browser can, due to its modified APIs, insert and/or wrap the proxy object into the validation request upon generation of the validation request, and the web browser can thus transmit both the validation request and the proxy object to the merchant backend server. In any case, the proxy object can be considered as executable computer logic that electronically fetches and/or returns, while the merchant backend server is executing and/or processing the validation request, an execution status of the validation request. In other words, the proxy object can detect and/or track when the merchant backend server has started processing the validation request, when the merchant backend server has finished processing the validation request, and/or whether the merchant backend server has determined the selected coupon code to be applicable to the electronic transaction checkout (e.g., valid) or not applicable to the electronic transaction checkout (e.g., invalid).

In various embodiments, the execution component of the computerized tool can electronically receive and/or access the execution status from the proxy object (e.g., the web browser can receive the execution status from the proxy object, and the execution component can access the execution status via the web browser). Moreover, in various aspects, the execution component of the computerized tool can electronically initiate any suitable computerized actions based on the execution status.

As a non-limiting example, if the execution status indicates that the merchant backend server has not yet finished processing (and/or has not yet started processing) the validation request, then the execution component can determine that another coupon code should not yet be entered and/or attempted. In such case, the execution component can prevent the coupon component from selecting a new coupon code from the plurality of electronic coupon codes and can prevent the proxy component from causing the merchant frontend website to instruct/command the web browser to generate/transmit a new validation request for the new coupon code. Note that, in this example, no new coupon code can be attempted prior to the merchant backend server completing its processing of the previous coupon code. In other words, implementation of the proxy object as described herein can prevent coupon codes from being attempted too quickly and/or too early. Thus, in stark contrast to existing techniques, implementation of the proxy object as described herein can help to prevent overloading of the merchant backend server and/or premature cancellation of processing of previous validation requests for previous coupon codes.

As another non-limiting example, if the execution status indicates that the merchant backend server has finished processing the validation request, and if the execution status further indicates that the merchant backend server has determined that the selected coupon code is not applicable to the electronic transaction checkout, then the execution component can determine that another coupon code should now be entered and/or attempted. Accordingly, the coupon component can select a new coupon code from the plurality of electronic coupon codes (e.g., can select a next highest discount coupon code), the proxy component can cause the merchant frontend website to instruct/command the web browser to generate/transmit a new validation request corresponding to the new coupon code to the merchant backend server, and the web browser, due to its modified APIs, can insert into the new validation request and/or can wrap around the new validation request a new proxy object. Note that, in this example, the new coupon code can be attempted/entered after the merchant backend server has finished processing the previous coupon code and before the merchant backend server has returned a validation result to the merchant frontend website. In other words, implementation of the proxy object as described herein can allow time to no longer be wasted on waiting for the merchant backend server to return its delayed results, in stark contrast to existing techniques.

As yet another non-limiting example, if the execution status indicates that the merchant backend server has finished processing the validation request, and if the execution status further indicates that the merchant backend server has determined that the selected coupon code is applicable to the electronic transaction checkout, then the execution component can electronically facilitate and/or perform the electronic transaction checkout according to the selected coupon code (e.g., can decrease the price of the product/service according to a discount corresponding to the selected coupon code).

Thus, in various aspects, the computerized tool described herein can leverage proxy objects so as to determine when to attempt and/or enter electronic coupon codes during an electronic transaction checkout. In some instances, the computerized tool can be implemented as a browser extension of the web browser (e.g., the Honey® browser extension can be programmed to facilitate the herein described functionalities).

Various embodiments described herein can be employed to use hardware and/or software to solve problems that are highly technical in nature (e.g., to facilitate proxy objects for tracking processing of electronic coupon codes), that are not abstract and that cannot be performed as a set of mental acts by a human. Further, some of the processes performed can be performed by a specialized computer (e.g., web browser, web browser extension, frontend website, backend server, proxy object) for carrying out defined tasks related to proxy objects for tracking processing of electronic coupon codes.

For example, some defined tasks of various embodiments described herein can include: determining that a web browser is performing an electronic transaction checkout on a merchant frontend website; causing the merchant frontend website to instruct the web browser to transmit a validation request to a merchant backend server, wherein the validation request identifies a coupon code and requests that the merchant backend server determine whether the coupon code is applicable to the electronic transaction checkout; causing the web browser to append a proxy object to the validation request, wherein the proxy object fetches, during execution of the validation request by the merchant backend server, an execution status of the validation request; receiving, from the proxy object, the execution status of the validation request; and initiating one or more electronic actions based on the execution status. In some cases, such defined tasks can further include: when the execution status indicates that the validation request has been fully executed by the merchant backend server and that the merchant backend server has determined that the coupon code is not applicable to the electronic transaction checkout, causing the merchant frontend website to instruct the web browser to transmit another validation request to the merchant backend server, wherein the another validation request identifies another coupon code and requests that the merchant backend server determine whether the another coupon code is applicable to the electronic transaction checkout. Furthermore, in various instances, such defined tasks can further include: when the execution status indicates that the validation request has not yet been fully executed by the merchant backend server, refraining from causing the merchant frontend website to instruct the web browser to transmit the another validation request to the merchant backend server.

Such defined tasks are not performed manually by humans. Indeed, neither the human mind nor a human with pen and paper can electronically cause a frontend website to instruct/command a web browser to generate/transmit a validation request for an entered coupon code, can electronically instruct/command the web browser to insert and/or wrap a proxy object into/around the validation request, can electronically receive data returned from and/or fetched by the proxy object, and can electronically initiate electronic actions based on the execution status. Instead, various embodiments described herein are inherently and inextricably tied to computer technology and cannot be implemented outside of a computing environment (e.g., web browsers, frontend websites, backend servers, and proxy objects are all inherently computerized constructs that cannot exist without computers; accordingly, a computerized tool that utilizes proxy objects to determine when to enter/apply electronic coupon codes on a frontend website so as to reduce wasted time and so as to reduce likelihood of overloading of a backend server and/or premature cancellation of validation requests is also an inherently computerized construct that cannot be implemented in any sensible, practical, and/or reasonable way without computers).

In various instances, embodiments described herein can integrate into a practical application the disclosed teachings regarding proxy objects for tracking processing of electronic coupon codes. As explained above, existing techniques for determining when to enter/attempt a next coupon code after a previous coupon code has already been entered/attempted either wait for an arbitrary amount of time or wait until the backend server returns a validation result for the previous coupon code. Unfortunately, the former scenario risks not waiting long enough (e.g., the backend server may require more than the arbitrary amount of time to fully process the previous coupon code), whereas the latter scenario risks waiting too long (e.g., there can often be a significant time delay between when the backend server finishes processing the previous coupon code and when the backend server generates/transmits the validation result). In stark contrast, the computerized tool described herein can ameliorate these technical problems. Specifically, the computerized tool can cause a proxy object to be appended with and/or to the validation request that the frontend website instructs the web browser to generate/transmit, and such proxy object can fetch (e.g., periodically, in some cases) for the computerized tool an execution status of the validation request while the validation request is being processed by the backend server. Thus, the computerized tool can become aware of when the backend server has finished processing the validation request, even if the backend server has not yet generated/transmitted its validation result to the web browser. Therefore, the computerized tool can avoid entering/attempting a new coupon code too soon, and the computerized tool can also avoid waiting too long before entering/attempting a new coupon code. Accordingly, various embodiments described herein constitute a concrete and tangible technical improvement as compared to existing techniques, and thus such embodiments certainly qualify as a useful and practical application of computers.

Moreover, in various aspects, embodiments described herein can control real-world and/or tangible devices based on the disclosed teachings. For example, a computerized tool as described herein can electronically enter real-world coupon codes into text fields of real-world e-commerce websites, which can cause such real-world e-commerce websites and/or real-world web browsers to generate validation requests, and can electronically insert and/or wrap such validation requests with proxy objects that periodically fetch execution statuses of such validation requests.

It should be appreciated that the figures described herein are non-limiting examples of various embodiments.

FIG. 1 illustrates a high-level block diagram of an example, non-limiting system 100 that can facilitate proxy objects for tracking processing of electronic coupon codes in accordance with one or more embodiments described herein. As shown, a proxy object system 102 can be electronically integrated, via any suitable wired and/or wireless electronic connections, with a web browser 104, a merchant frontend website 106, and/or a merchant backend server 108.

In various embodiments, the web browser 104 can be any suitable web browser that can electronically browse, visit, and/or interact with any suitable computerized resources (e.g., webpages) on any suitable computer network (e.g., the Internet). Non-limiting examples of the web browser 104 can include Chrome®, Firefox®, Safari®, Microsoft Edge®, and/or Internet Explorer®.

In various embodiments, the merchant frontend website 106 can be any suitable e-commerce website (e.g., collection of e-commerce webpages) that can reside on any suitable computer network (e.g., the Internet) and that can offer any suitable product and/or service for online sale. Non-limiting examples of the merchant frontend website 106 can include amazon.com and/or ebay.com.

In various embodiments, the merchant backend server 108 can be any suitable computing device that can perform any suitable computations, any suitable calculations, and/or any suitable processing functionalities for the merchant frontend website 106. As a non-limiting example, the merchant frontend website 106 can inform the merchant backend server 108 of one or more coupon codes, and the merchant backend server 108 can process the one or more coupon codes to determine whether or not they are applicable and/or valid.

In any case, the web browser 104 can engage and/or participate in an electronic transaction on and/or with the merchant frontend website 106, and a user of the web browser 104 can desire to apply one or more coupon codes to the electronic transaction. In various instances, the proxy object system 102 can facilitate such application of coupon codes, as described herein.

In various embodiments, the proxy object system 102 can comprise a processor 110 (e.g., computer processing unit, microprocessor) and a computer-readable memory 112 that is operably coupled to the processor 110. The memory 112 can store computer-executable instructions which, upon execution by the processor 110, can cause the processor 110 and/or other components of the proxy object system 102 (e.g., monitoring component 114, coupon component 116, proxy component 118, and/or execution component 120) to perform one or more acts. In various embodiments, the memory 112 can store computer-executable components (e.g., monitoring component 114, coupon component 116, proxy component 118, and/or execution component 120), and the processor 110 can execute the computer-executable components.

In various embodiments, the proxy object system 102 can comprise a monitoring component 114. In various aspects, as described herein, the monitoring component 114 can electronically determine when and/or that the web browser 104 is performing an electronic transaction checkout with the merchant frontend website 106.

In various embodiments, the proxy object system 102 can comprise a coupon component 116. In various instances, as described herein, the coupon component 116 can electronically identify a set of coupon codes based on the electronic transaction checkout, and can electronically select one of such set of coupon codes.

In various embodiments, the proxy object system 102 can comprise a proxy component 118. In various cases, as described herein, the proxy component 118 can electronically cause the merchant frontend website 106 to command the web browser 104 to transmit a validation request to the merchant backend server 108, where the validation request instructs the merchant backend server 108 to validate and/or invalidate the selected coupon code. Furthermore, the proxy component 118 can electronically adjust any suitable APIs of the web browser 104, so that the web browser 104 automatically appends a proxy object to the validation request, where the proxy object can fetch and/or return the execution status of the validation request.

In various embodiments, the proxy object system 102 can comprise an execution component 120. In various instances, as described herein, the execution component 120 can electronically receive and/or access the execution status fetched by the proxy object, and the execution component 120 can electronically take any suitable action based on the execution status.

Figure 2:
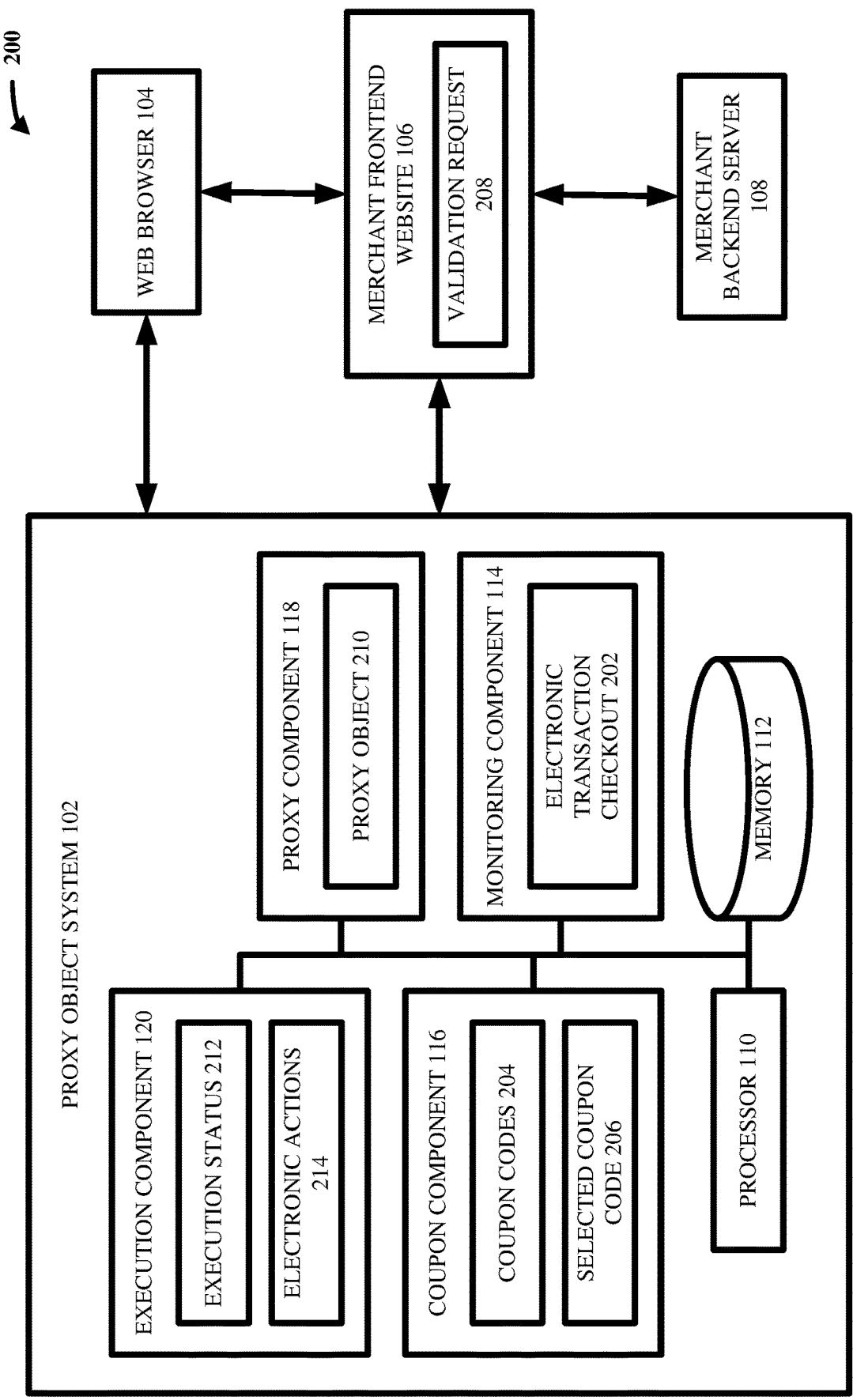
FIG. 2 illustrates a high-level block diagram of an example, non-limiting system including various additional components that facilitates proxy objects for tracking processing of electronic coupon codes in accordance with one or more embodiments described herein.

FIG. 2 illustrates a high-level block diagram of an example, non-limiting system 200 including various additional components that can facilitate proxy objects for tracking processing of electronic coupon codes in accordance with one or more embodiments described herein. As shown, the system 200 can, in some cases, comprise the same components as the system 100, and can further comprise an electronic transaction checkout 202, a set of coupon codes 204, a selected coupon code 206, a validation request 208, a proxy object 210, an execution status 212, and/or one or more electronic actions 214.

In various embodiments, the monitoring component 114 can electronically determine when, whether, and/or that the web browser 104 is performing, facilitating, participating in, and/or otherwise engaging in an electronic transaction checkout 202 with the merchant frontend website 106. More specifically, in various aspects, the monitoring component 114 can electronically track, electronically monitor, electronically record, and/or otherwise electronically surveil the browsing activity and/or browsing behavior of the web browser 104. That is, the monitoring component 114 can track/monitor/record which web resources (e.g., which uniform resource locators (URLs)) the web browser 104 visits and can track/monitor/record which invocable user-interface elements (e.g., which webpage buttons) the web browser 104 clicks/selects. In some instances, the web browser 104 can visit a URL associated with the merchant frontend website 106, and the web browser 104 can click/select an invocable user-interface element of the merchant frontend website 106 that begins and/or initiates the electronic transaction checkout 202. As a non-limiting example, the merchant frontend website 106 can offer a product/service for sale, the merchant frontend website 106 can have a "buy now" button and/or a "proceed to checkout" button with respect to the product/service, and the web browser 104 can click/select the "buy now" button and/or the "proceed to checkout" button, which can initialize and/or begin the electronic transaction checkout 202. Because the monitoring component 114 can track/monitor/record the activity of the web browser 104, the monitoring component 114 can know when and/or that the web browser 104 has clicked/selected the "buy now" button and/or the "proceed to checkout" button. In any case, the monitoring component 114 can thus know that the web browser 104 is engaging in the electronic transaction checkout 202 with and/or on the merchant frontend website 106.

In some aspects, the monitoring component 114 can detect and/or identify any suitable characteristics and/or features associated with the electronic transaction checkout 202. For example, the monitoring component 114 can detect and/or identify, based on the tracked/monitored/recorded activity of the web browser 104, which product/service is involved in the electronic transaction checkout 202. As another example, the monitoring component 114 can detect and/or identify, based on the tracked/monitored/recorded activity of the web browser 104, a price of the product/service that is involved in the electronic transaction checkout 202. As still another example, the monitoring component 114 can detect and/or identify, based on the tracked/monitored/recorded activity of the web browser 104, an identity of the merchant that owns and/or operates and/or otherwise corresponds to the merchant frontend website 106. As yet another example, the monitoring component 114 can detect and/or identify, based on the tracked/monitored/recorded activity of the web browser 104, a time/date of the electronic transaction checkout 202. In various cases, the monitoring component 114 can detect and/or identify any other suitable characteristics/features of the electronic transaction checkout 202.

In various embodiments, the coupon component 116 can electronically identify a set of coupon codes 204, based on the electronic transaction checkout 202. More specifically, in various aspects, the coupon component 116 can control, access, and/or otherwise be in electronic communication with any suitable number of any suitable databases (not shown), and such databases can electronically store and/or otherwise electronically maintain any suitable number of coupon codes. In various instances, the coupon component 116 can electronically retrieve and/or electronically extract any suitable number of such coupon codes from such databases, and such extracted coupon codes can be considered as the set of coupon codes 204. For example, as mentioned above, the monitoring component 114 can identify and/or detect any suitable characteristics/features that describe and/or define the electronic transaction checkout 202. Accordingly, the coupon component 116 can query the databases for coupon codes that match and/or purportedly match such characteristics/features, and any coupon codes that match and/or purportedly match such characteristics/features can be considered as the set of coupon codes 204. In any case, the set of coupon codes 204 can include n coupon codes for any suitable positive integer n. Furthermore, in various aspects, each of the set of coupon codes 204 can be any suitable alphanumeric code that represents and/or otherwise indicates a transactional discount that might be applicable to the electronic transaction checkout 202.

In various instances, the coupon component 116 can electronically select any of the set of coupon codes 204, and such coupon code can be considered as a selected coupon code 206. In some cases, the coupon component 116 can identify and/or select the selected coupon code 206 based on an amount of discount associated with the selected coupon code 206. For example, the selected coupon code 206 can correspond to a highest discount that is available in the set of coupon codes 204.

In various embodiments, the proxy component 118 can electronically cause the merchant frontend website 106 to issue an instruction and/or command (not shown) to the web browser 104, where such instruction and/or command can cause the web browser 104 to electronically generate and/or transmit a validation request 208 to the merchant backend server 108. In various aspects, the validation request 208 can be any suitable computer-executable message (e.g., an HTTP request) that can ask and/or otherwise cause the merchant backend server 108 to process the selected coupon code 206 (e.g., to verify whether the selected coupon code 206 is actually applicable to the electronic transaction checkout 202). As a non-limiting example, the merchant frontend website 106 can include an input field in which text can be typed, pasted, and/or otherwise inputted, and the merchant frontend website 106 can further include an invocable user-interface element that is associated with such input field. In various cases, the input field can be configured to receive a coupon code (e.g., the input field can be an "insert coupon code here" field), and the invocable user-interface element can be configured to cause, upon invocation, the merchant frontend website 106 to instruct/command the web browser 104 to generate and transmit to the merchant backend server 108 a validation request with respect to the inputted coupon code (e.g., the invocable user-interface element can be an "apply coupon code" button and/or a "validate coupon code" button). Thus, in various instances, the proxy component 118 can instruct the web browser 104 to type and/or copy-and-paste the selected coupon code 206 into the input field, and the proxy component 118 can then instruct the web browser 104 to click and/or select the invocable user-interface element. This can cause the merchant frontend website 106 to instruct and/or otherwise command the web browser 104 to transmit the validation request 208 to the merchant backend server 108. In other words, the proxy component 118 can ultimately cause the validation request 208 to be transmitted to the merchant backend server 108.

In various embodiments, the proxy component 118 can electronically cause the web browser 104 to append a proxy object 210 onto, into, and/or with the validation request 208. In various embodiments, the proxy object 210 can be any suitable computer-executable logic (e.g., one or more lines of computer-executable code) that can be inserted into the validation request 208 and/or that can be wrapped around the validation request 208, where such computer-executable logic can electronically fetch, return, and/or report an execution status 212 of the validation request 208. As a non-limiting example, the validation request 208 can be an HTTP request, and the proxy object 210 can be one or more lines of computer-executable code (e.g., JavaScript) that can be inserted into a message body of the HTTP request and/or wrapped around a message body of the HTTP request. In any case, the proxy object 210 can electronically fetch, return, report, and/or generate the execution status 212, where the execution status 212 can be any suitable electronic information indicating when and/or whether the merchant backend server 108 started processing the validation request 208, when and/or whether the merchant backend server 108 completed processing the validation request 208, and/or when and/or whether the merchant backend server 108 determined that the selected coupon code 206 is applicable to (and/or inapplicable to) the electronic transaction checkout 202.

As a specific and non-limiting example, the proxy component 118 can cause the web browser 104 to append the proxy object 210 onto, into, and/or with the validation request 208 by electronically modifying and/or adjusting any suitable APIs of the web browser 104. Indeed, as those having ordinary skill in the art will appreciate, a web browser can electronically generate and/or transmit web requests, and the contents of such web requests can be dictated by the APIs (e.g., fetch APIs and/or XmlHttpRequest APIs) of the web browser. Accordingly, the contents of any web requests generated by a web browser can be controlled by commensurately controlling the APIs of the web browser. Thus, in various embodiments, the proxy component 118 can electronically adjust and/or modify any suitable APIs (e.g., fetch API and/or XmlHttpRequest API) of the web browser 104, where such adjustment and/or modification can be considered as an instruction and/or command to insert a proxy object into any web request generated by the web browser 104 (e.g., an instruction/command to wrap any web request generated by the web browser 104 with a proxy object). In other words, the proxy component 118 can, in some cases, be considered as temporarily reprogramming the web browser 104 (e.g., reprogramming one or more APIs of the web browser 104), so that the web browser 104 automatically inserts and/or wraps a proxy object into the web requests that the web browser 104 generates/transmits. Accordingly, when the merchant frontend website 106 instructs the web browser 104 to generate the validation request 208, the web browser 104 can, due to its modified APIs, automatically generate the validation request 208 such that the proxy object 210 is inserted into and/or wrapped around the validation request 208.

In various aspects, any modifications made by the proxy component 118 to APIs of the web browser 104 can be considered as temporary. For example, in some cases, the APIs can automatically revert back to normal upon refreshing of the web browser 104. As another example, in other cases, the proxy component 118 can undo any modifications/adjustments to the APIs of the web browser 104 at any suitable time (e.g., when the web browser 104 leaves the merchant frontend website 106).

In various embodiments, the execution component 120 can electronically receive and/or otherwise electronically access the execution status 212 as fetched and/or returned by the proxy object 210. For instance, the proxy object 210 can cause the execution status 212 to be transmitted to the execution component 120. In other instances, the proxy object 210 can cause the execution status 212 to be transmitted to the web browser 104, and the execution component 120 can access the execution status 212 by electronically interacting with and/or otherwise commanding the web browser 104. In various aspects, the execution component 120 can electronically initiate one or more electronic actions 214, based on the execution status 212.

In various instances, the one or more electronic actions 214 can include the following: when the execution status 212 indicates that the validation request 208 has been fully processed/executed by the merchant backend server 108, and when the execution status 212 further indicates that the selected coupon code 206 is properly applicable to the electronic transaction checkout 202, then the execution component 120 can determine/conclude that no additional coupon codes need to be entered/attempted. So, the execution component 120 can electronically facilitate and/or perform the electronic transaction checkout 202 according to the selected coupon code 206 (e.g., the price of the product/service that is being offered for sale by the merchant frontend website 106 and purchased by the web browser 104 can be reduced by a discount percentage corresponding to the selected coupon code 206).

In various cases, the one or more electronic actions 214 can include the following: when the execution status 212 indicates that the validation request 208 has been fully processed/executed by the merchant backend server 108, and when the execution status 212 further indicates that the selected coupon code 206 is not properly applicable to the electronic transaction checkout 202, then the execution component 120 can determine/conclude that an additional coupon code should be entered/attempted. So, the coupon component 116 can select a new coupon code from the set of coupon codes 204, the proxy component 118 can cause the merchant frontend website 106 to instruct/command the web browser 104 to generate a new validation request instructing the merchant backend server 108 to process/validate the new selected coupon code, and the web browser 104 can, again due to its modified APIs, append a new proxy object into, onto, and/or otherwise with the new validation request. Note that, in such case, the proxy object system 102 can cause the new validation request to be sent to the merchant backend server 108, without having to wait for the merchant backend server 108 to return any validation results back to the web browser 104. In other words, implementation of the proxy object 210 can help to reduce an amount of time that would have been wasted if some existing techniques were implemented (e.g., such existing techniques would have delayed transmitting the new validation request until after the merchant backend server 108 returned its validation results for the validation request 208 to the web browser 104).

In various aspects, the one or more electronic actions 214 can include the following: when the execution status 212 indicates that the validation request 208 has not yet been fully processed/executed by the merchant backend server 108, then the execution component 120 can determine/conclude that no additional coupon codes need to be entered/attempted yet. So, the execution component 120 can prevent the coupon component 116 from selecting a new coupon code from the set of coupon codes 204, and/or can prevent the proxy component 118 from causing the merchant frontend website 106 to instruct/command the web browser 104 to generate a new validation request that instructs the merchant backend server 108 to process/validate the new selected coupon code. Note that, in such case, the proxy object system 102 can refrain from entering/attempting a new coupon code when the merchant backend server 108 has not yet finished processing/executing the previous coupon code. In other words, implementation of the proxy object 210 can help to ensure that coupon codes are not entered/attempted too quickly, which can help to prevent overloading the merchant backend server 108 and/or premature cancellation of processing of the validation request 208, unlike some existing techniques (e.g., such existing techniques could have transmitted the new validation request before the merchant backend server 108 finished processing/executing the validation request 208).

Figure 3:
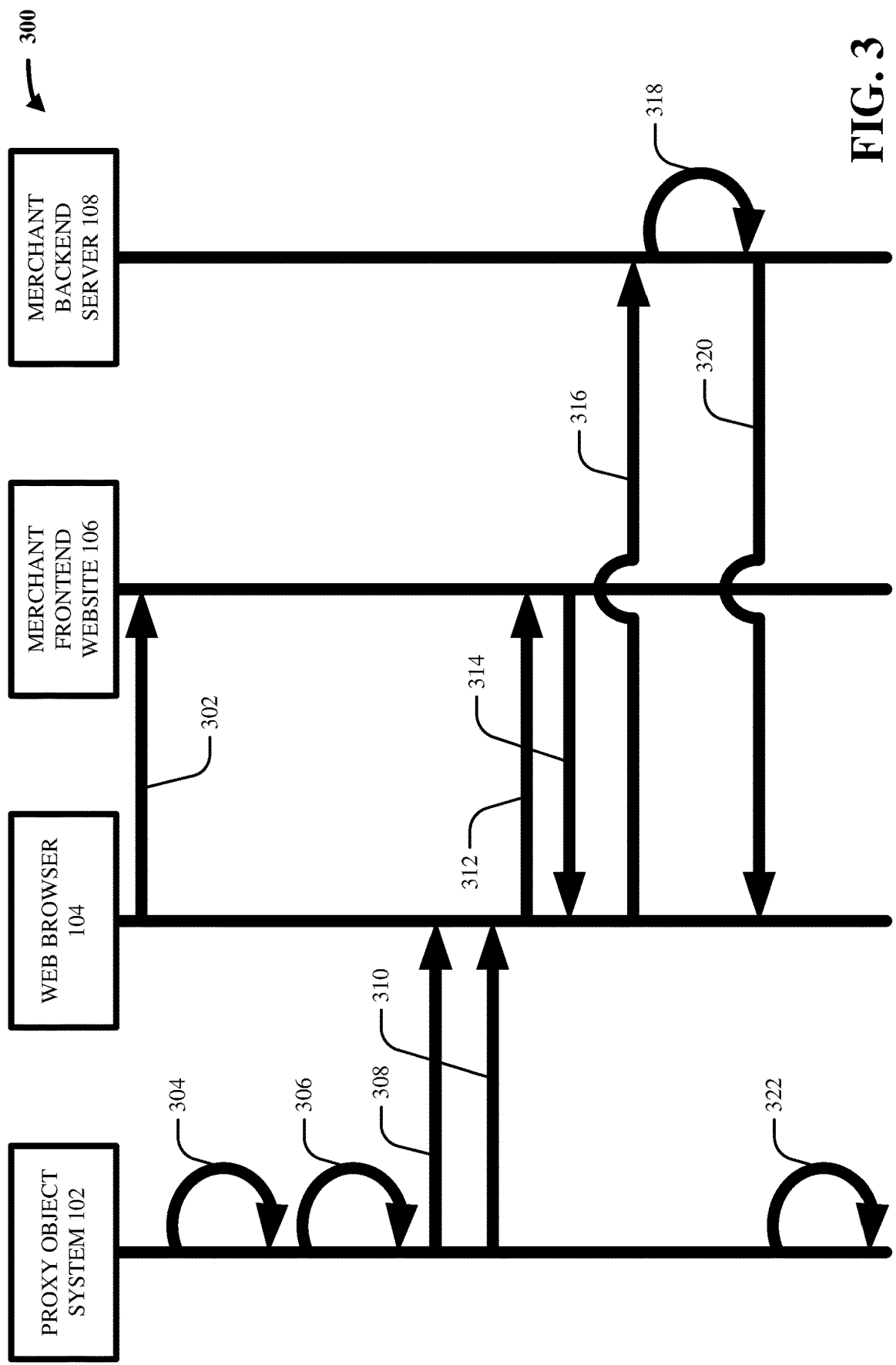
FIG. 3 illustrates an example, non-limiting communication diagram for facilitating proxy objects for tracking processing of electronic coupon codes in accordance with one or more embodiments described herein.

To help further understand various embodiments described herein, consider FIG. 3. FIG. 3 illustrates an example, non-limiting communication diagram 300 for facilitating proxy objects for tracking processing of electronic coupon codes in accordance with one or more embodiments described herein.

In various embodiments, as shown, the web browser 104 can, at act 302, electronically engage and/or participate in the electronic transaction checkout 202 with and/or on the merchant frontend website 106. As mentioned above, this can include the web browser 104 visiting a URL of the merchant frontend website 106 and/or clicking on a "proceed to checkout" button of the merchant frontend website 106.

In various aspects, the proxy object system 102 can, at act 304, electronically detect and/or electronically determine that the web browser 104 is engaging/participating in the electronic transaction checkout 202. As explained above, this can include tracking/observing the browsing activity of the web browser 104 (e.g., tracking/observing which URLs are visited by the web browser 104 and/or which webpage buttons are clicked by the web browser 104).

In various instances, the proxy object system 102 can, at act 306, electronically identify the set of coupon codes 204. As mentioned above, this can include searching any suitable number of any suitable databases for coupon codes that correspond to and/or that purport to correspond to the characteristics/features of the electronic transaction checkout 202 (e.g., product/service, price, time/date, merchant identity). Moreover, the proxy object system 102 can, at act 306, select the selected coupon code 206 from the set of coupon codes 204 (e.g., can select a highest discount coupon code from the set of coupon codes 204).

In various cases, the proxy object system 102 can, at act 308, adjust and/or modify any suitable APIs (e.g., fetch APIs and/or XmlHttpRequest APIs) of the web browser 104, which adjustment and/or modification can cause the web browser 104 to automatically insert and/or wrap a proxy object into any web requests that are generated by the web browser 104. Again, this can be considered as temporary reprogramming of the web browser 104.

In various aspects, the proxy object system 102 can, at act 310, instruct and/or command the web browser 104 to type and/or copy-and-paste the selected coupon code 206 into an appropriate input field of the merchant frontend website 106 and to click on an appropriate button (e.g., an "apply coupon code" button) of the merchant frontend website 106.

In various instances, the web browser 104 can, at act 312, perform the instructions/commands given to it by the proxy object system 102 in act 310. That is, the web browser 104 can, at act 312, type and/or copy-and-paste the selected coupon code 206 into an appropriate input field of the merchant frontend website 106 and can click on an appropriate button (e.g., an "apply coupon code" button) of the merchant frontend website 106.

In various cases, the merchant frontend website 106 can, at act 314 and in response to act 312, instruct and/or command the web browser 104 to generate the validation request 208 and to transmit the validation request 208 to the merchant backend server 108.

In various aspects, the web browser 104 can, at act 316, perform the instructions/commands given to it by the merchant frontend website 106 in act 314. That is, the web browser 104 can, at act 316, generate and transmit the validation request 208 to the merchant backend server 108. Note that, because the proxy object system 102 had modified and/or adjusted the APIs of the web browser 104 in act 308, the web browser 104 can, at act 316, generate the validation request 208, such that the proxy object 210 is inserted into and/or wrapped around the validation request 208.

In various instances, the merchant backend server 108 can, at act 318, begin to process and/or execute the validation request 208.

In various cases, the proxy object 210, which can be considered as being at the merchant backend server 108 at this point, can, at act 320, fetch and/or return to the web browser 104 the execution status 212. Note that this can occur during execution of the validation request 208 by the merchant backend server 108 and/or otherwise before the merchant backend server 108 has fully processed/executed the validation request 208.

In various aspects, the proxy object system 102 can, at act 322, access the execution status 212 and initiate the one or more electronic actions 214 based on the execution status 212. As explained above, this can include: waiting to enter/attempt another coupon code, entering/attempting another coupon code, and/or performing the electronic transaction checkout 202 according to the selected coupon code 206.

In various embodiments, the proxy object system 102 can iterate through the set of coupon codes 204 (e.g., in order of decreasing amount of discount) until an acceptable coupon code is identified, and/or until all of the set of coupon codes 204 have been deemed invalid by the merchant backend server 108. This is further explained with respect to FIGS. 4-5.

Figure 4:
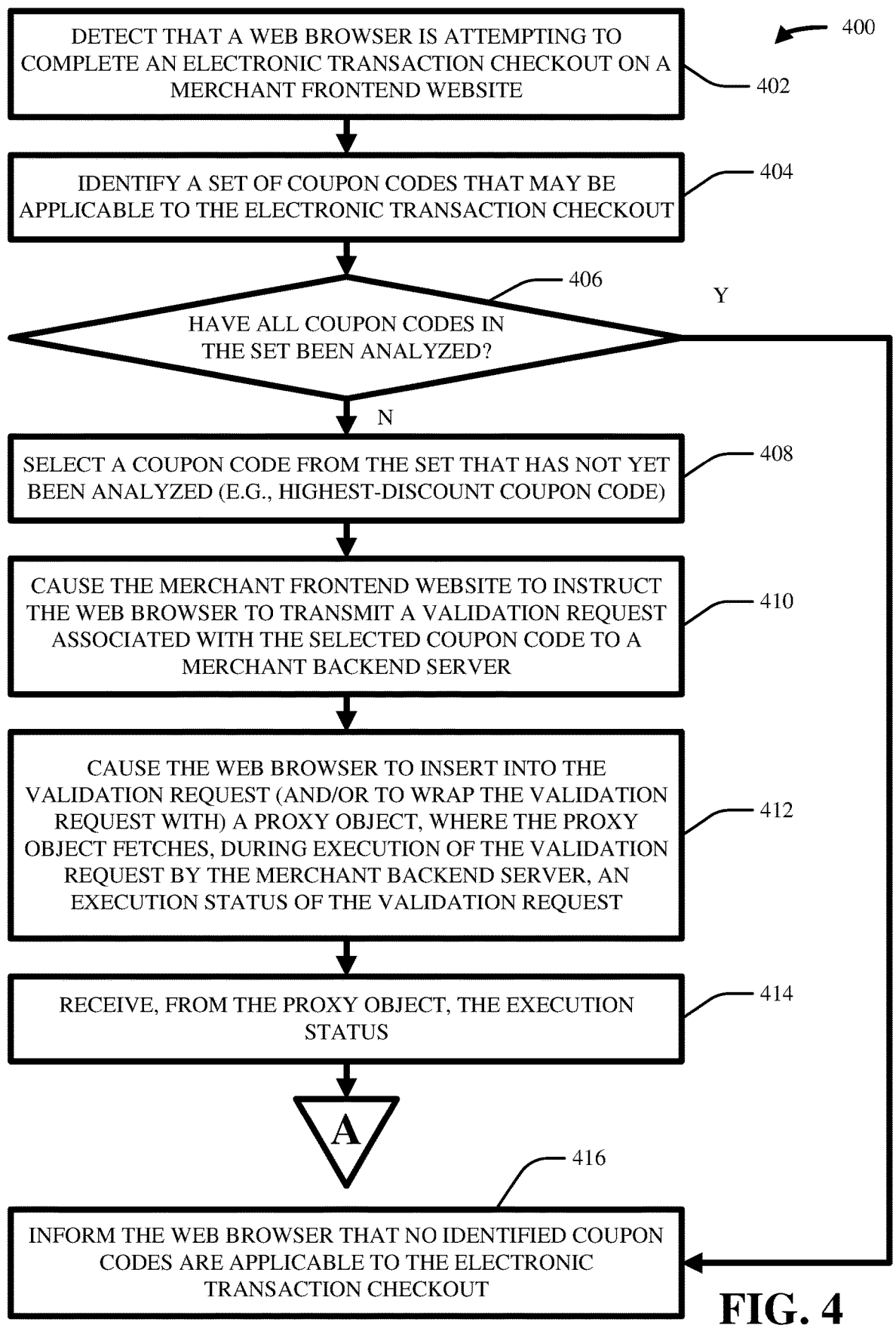
FIGS. 4-5 illustrate high-level flow diagrams of example, non-limiting computer-implemented methods that facilitate proxy objects for tracking processing of electronic coupon codes in accordance with one or more embodiments described herein.
Figure 5:
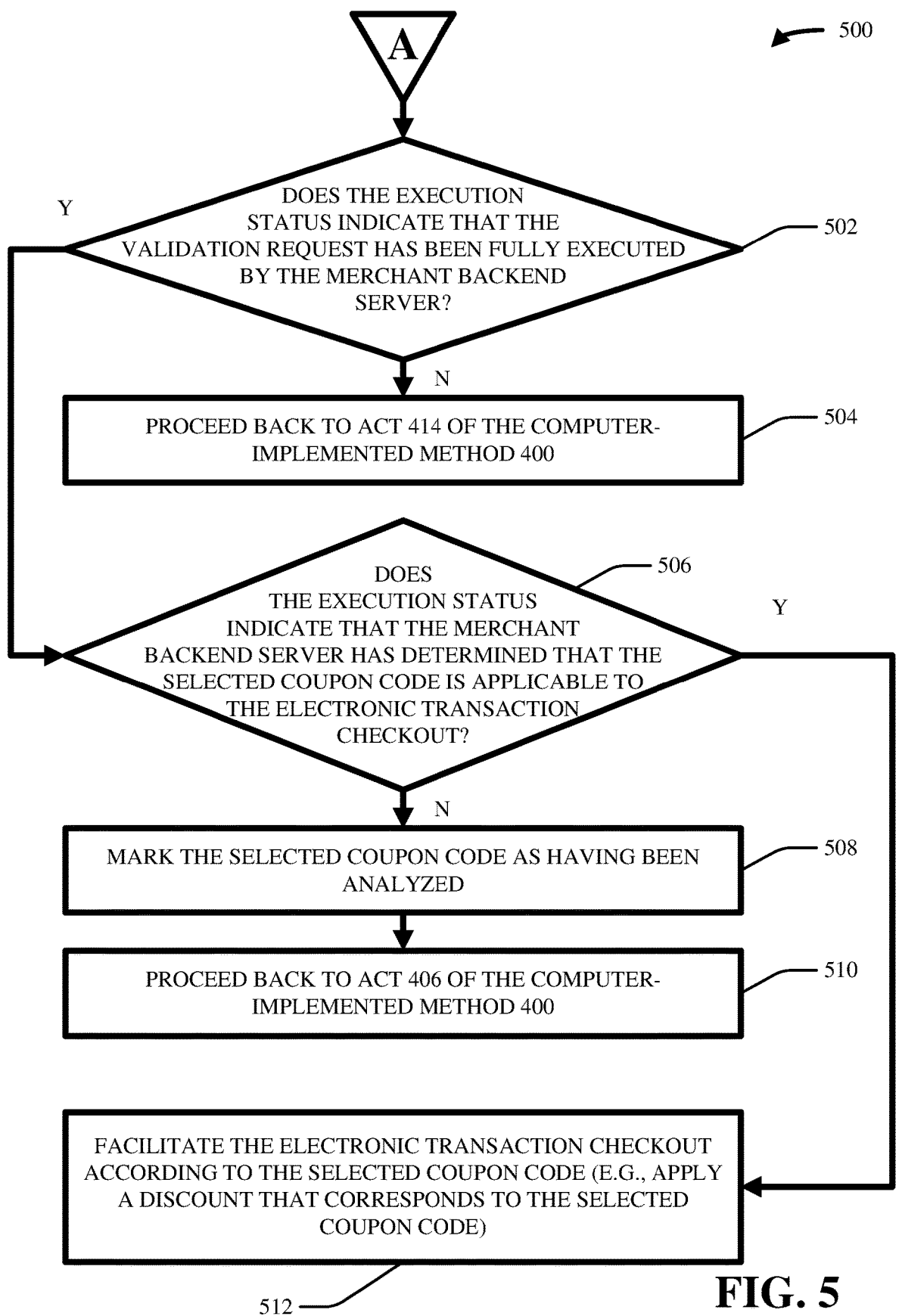

FIGS. 4-5 illustrate high-level flow diagrams of example, non-limiting computer-implemented methods 400 and 500 that can facilitate proxy objects for tracking processing of electronic coupon codes in accordance with one or more embodiments described herein. In various cases, the proxy object system 102 can facilitate the computer-implemented methods 400 and 500.

In various embodiments, as shown, act 402 can include detecting, by a device (e.g., via monitoring component 114) operatively coupled to a processor, that a web browser (e.g., 104) is attempting to complete an electronic transaction checkout (e.g., 202) on a merchant frontend website (e.g., 106).

In various aspects, act 404 can include identifying, by the device (e.g., via coupon component 116), a set of coupon codes (e.g., 204) that may and/or might be applicable to the electronic transaction checkout.

In various instances, act 406 can include determining, by the device (e.g., via coupon component 116), whether all coupon codes in the set of coupon codes have been analyzed by the device. If not, the computer-implemented method 400 can proceed to act 408. If so, the computer-implemented method 400 can proceed to act 416.

In various cases, act 408 can include selecting, by the device (e.g., via coupon component 116), a coupon code (e.g., the selected coupon code 206) from the set of coupon codes that has not yet been analyzed by the device. As mentioned above, any suitable selection order and/or priority order can be implemented. As a non-limiting example, a highest-discount coupon code that has not yet been analyzed can be selected from the set of coupon codes.

In various aspects, act 410 can include causing, by the device (e.g., via proxy component 118), the merchant frontend website to instruct the web browser to transmit a validation request (e.g., 208) associated with the selected coupon code to a merchant backend server (e.g., 108).

In various instances, act 412 can include causing, by the device (e.g., via proxy component 118), the web browser to insert into the validation request (and/or otherwise wrap the validation request with) a proxy object (e.g., 210). In various cases, the proxy object can fetch, during execution of the validation request by the merchant backend server, an execution status (e.g., 212) of the validation request. As mentioned above, this can, in some cases, include modifying and/or adjusting (e.g., via proxy component 118) any suitable APIs of the web browser 104. Although not explicitly shown in FIG. 4, those having ordinary skill in the art will appreciate that such modifying and/or adjusting of APIs can be facilitated and/or performed prior to act 406. After all, once the APIs of the web browser are modified/adjusted as described herein, the web browser can automatically insert and/or wrap a proxy object into any and/or all web requests generated thereafter by the web browser (e.g., at least until the web browser's APIs are refreshed and/or reverted back to normal by the proxy component 118). In any case, the proxy object can be inserted and/or wrapped into the validation request at act 412.

In various aspects, act 414 can include receiving, by the device (e.g., via execution component 120) and from the proxy object, the execution status. As shown in FIGS. 4-5, act 414 of the computer-implemented method 400 can then proceed to act 502 of the computer-implemented method 500.

In various instances, as shown, act 416 can include informing, by the device (e.g., via execution component 120), the web browser that no identified coupon codes are applicable to the electronic transaction checkout. As shown by FIGS. 4-5, act 416 can be reached after all of the set of coupon codes have been analyzed and found to be inapplicable to the electronic transaction checkout.

Now, consider the computer-implemented method 500. In various instances, as shown, act 502 can include determining, by the device (e.g., via execution component 120), whether the execution status indicates that the validation request has been fully and/or completely executed by the merchant backend server. If not, the computer-implemented method 500 can proceed to act 504. If so, the computer-implemented method 500 can proceed to act 506.

In various aspects, act 504 can include proceeding, by the device (e.g., via execution component 120), back to act 414 of the computer-implemented method 400. That is, in various cases, the proxy object can periodically and/or repeatedly fetch/return an execution status of the validation request.

In various instances, act 506 can include determining, by the device (e.g., via execution component 120), whether the execution status indicates that the merchant backend server has determined that the selected coupon code is applicable to the electronic transaction checkout. If not, the computer-implemented method 500 can proceed to act 508. If so, the computer-implemented method 500 can proceed to act 512.

In various cases, act 508 can include marking, by the device (e.g., via coupon component 116), the selected coupon code as having been analyzed.

In various aspects, act 510 can include proceeding, by the device (e.g., via coupon component 116), back to act 506 of the computer-implemented method 400. That is, in various cases, the device can select a new coupon code to attempt (if such a new coupon code is available in the set of coupon codes).

In various instances, act 512 can include facilitating, by the device (e.g., via execution component 120), the electronic transaction checkout according to the selected coupon code. As an example, this can include reducing the price of the product/service that is involved in the electronic transaction checkout by a discount that corresponds to the selected coupon code.

Accordingly, as shown in FIGS. 4-5, the proxy object system 102 can iterate through the set of coupon codes 204, based on execution statuses returned by proxy objects, rather than based on delayed validation results returned by the merchant backend server 108 and rather than based on arbitrary wait times.

Figure 6:
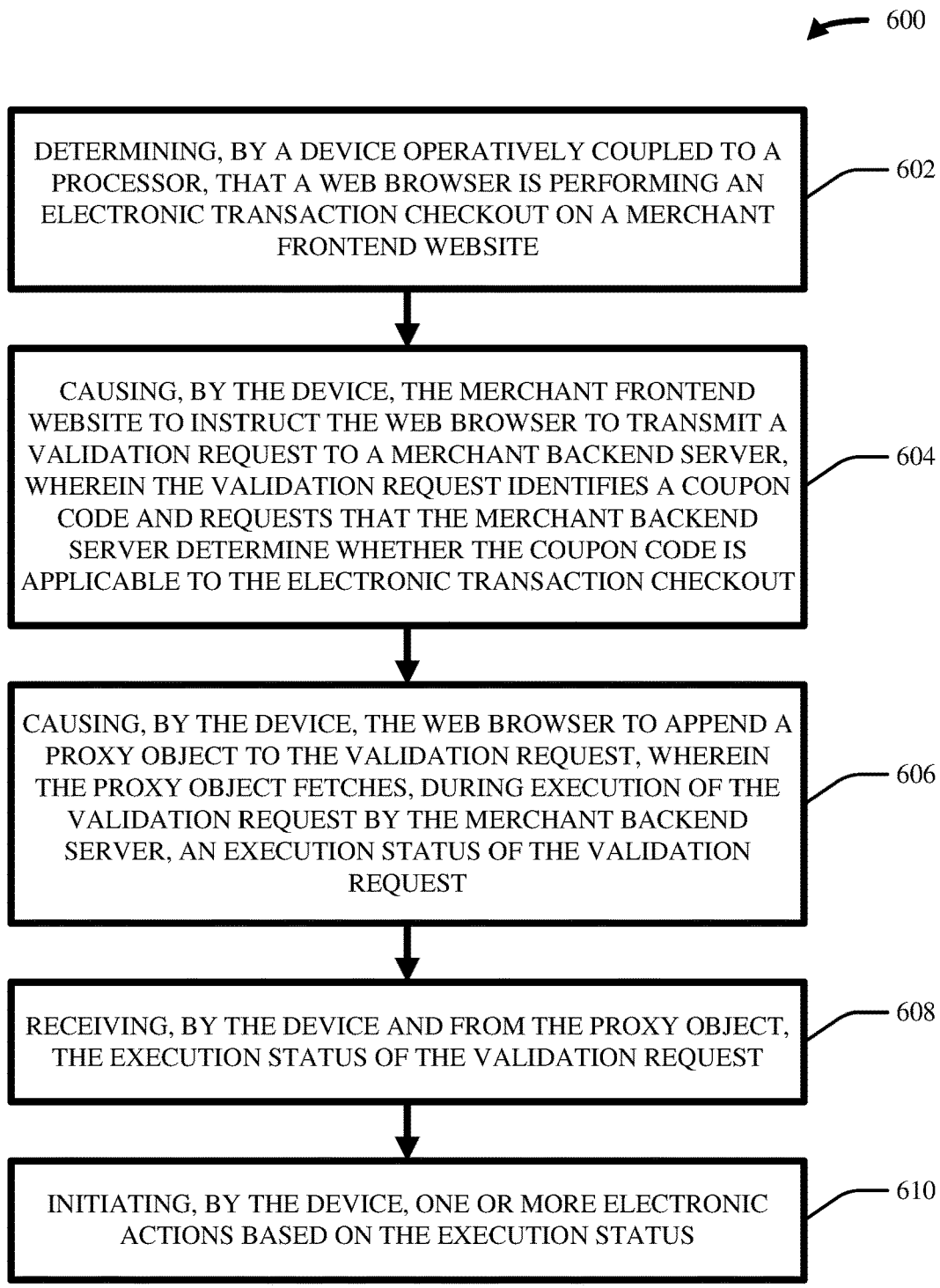
FIG. 6 illustrates a high-level flow diagram of an example, non-limiting computer-implemented method that facilitates proxy objects for tracking processing of electronic coupon codes in accordance with one or more embodiments described herein.

FIG. 6 illustrates a high-level flow diagram of an example, non-limiting computer-implemented method 600 that can facilitate proxy objects for tracking processing of electronic coupon codes in accordance with one or more embodiments described herein. In various cases, the proxy object system 102 can facilitate the computer-implemented method 600.

In various embodiments, act 602 can include determining, by a device (e.g., via monitoring component 114) operatively coupled to a processor, that a web browser (e.g., 104) is performing an electronic transaction checkout (e.g., 202) on and/or with a merchant frontend website (e.g., 106).

In various aspects, act 604 can include causing, by the device (e.g., via proxy component 118), the merchant frontend website to instruct the web browser to transmit a validation request (e.g., 208) to a merchant backend server (e.g., 108), wherein the validation request identifies a coupon code (e.g., the selected coupon code 206) and requests that the merchant backend server determine whether the coupon code is applicable to the electronic transaction checkout.

In various instances, act 606 can include causing, by the device (e.g., via proxy component 118), the web browser to append a proxy object (e.g., 210) to the validation request, wherein the proxy object fetches, during execution of the validation request by the merchant backend server, an execution status (e.g., 212) of the validation request.

In various cases, act 608 can include receiving, by the device (e.g., via execution component 120) and from the proxy object, the execution status of the validation request.

In various aspects, act 610 can include initiating, by the device (e.g., via execution component 120), one or more electronic actions (e.g., 214) based on the execution status.

Although not explicitly shown in FIG. 6, the one or more electronic actions can comprise: when the execution status indicates that the validation request has been fully executed by the merchant backend server and that the merchant backend server has determined that the coupon code is not applicable to the electronic transaction checkout, causing, by the device (e.g., via proxy component 118), the merchant frontend website to instruct the web browser to transmit another validation request to the merchant backend server, wherein the another validation request identifies another coupon code (e.g., another of coupon codes 204) and requests that the merchant backend server determine whether the another coupon code is applicable to the electronic transaction checkout (e.g., as shown with respect to FIGS. 4-5).

Although not explicitly shown in FIG. 6, the one or more electronic actions can comprise: when the execution status indicates that the validation request has not yet been fully executed by the merchant backend server, refraining, by the device (e.g., via execution component 120), from causing the merchant frontend website to instruct the web browser to transmit the another validation request to the merchant backend server (e.g., as shown with respect to FIGS. 4-5).

Although not explicitly shown in FIG. 6, the one or more electronic actions can comprise: when the execution status indicates that the validation request has been fully executed by the merchant backend server and that the merchant backend server has determined that the coupon code is applicable to the electronic transaction checkout, facilitating, by the device (e.g., via execution component 120), the electronic transaction checkout according to the coupon code.

Although not explicitly shown in FIG. 6, the computer-implemented method 600 can further include: identifying, by the device (e.g., via coupon component 116), the coupon code based on the electronic transaction checkout.

Although not explicitly shown in FIG. 6, the proxy object can periodically fetch the execution status of the validation request (e.g., as shown with respect to FIGS. 4-5).

Although not explicitly shown in FIG. 6, the validation request can be an HTTP request, and the proxy object can be JavaScript code that is inserted into or wrapped around a body of the HTTP request.

Accordingly, various embodiments described herein include a computerized tool that can electronically enter and/or attempt coupon codes during an online e-commerce transaction, by leveraging proxy objects to determine when to enter/attempt such coupon codes. Such a computerized tool can help to ensure that coupon codes are not entered in too quick a succession, while also helping to ensure that coupon codes are not entered with unnecessary delay. Such a computerized tool certainly constitutes a useful and practical application of computers.

Although the herein disclosure mainly describes various embodiments as applying to electronic coupon codes, this is a mere non-limiting example. Those having ordinary skill in the art will appreciate that, in various embodiments, the herein described teachings can be extrapolated and/or applied to any suitable electronic codes (e.g., alphanumeric codes) in any suitable operational context.

Furthermore, those having ordinary skill in the art will appreciate that various embodiments described herein can be applied in any suitable computing context. For example, in some cases, the herein described teachings regarding use of proxy objects to track execution statuses of entered coupon codes can be implemented in conjunction with a computer desktop web browser (e.g., 104) that interacts with a merchant frontend website (e.g., 106) and/or a merchant backend server (e.g., 108). As another example, in some cases, the herein described teachings regarding use of proxy objects to track execution statuses of entered coupon codes can be implemented in conjunction with a webview that is launched in and/or around a mobile application (e.g., a "mobile app") associated with a merchant.

In various instances, machine learning algorithms and/or models can be implemented in any suitable way to facilitate any suitable aspects described herein. To facilitate some of the above-described machine learning aspects of various embodiments of the subject innovation, consider the following discussion of artificial intelligence (AI). Various embodiments of the present innovation herein can employ artificial intelligence to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z_1, z_2, z_3, z_4, z_n)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Those having ordinary skill in the art will appreciate that the herein disclosure describes non-limiting examples of various embodiments of the subject innovation. For ease of description and/or explanation, various portions of the herein disclosure utilize the term "each" when discussing various embodiments of the subject innovation. Those having ordinary skill in the art will appreciate that such usages of the term "each" are non-limiting examples. In other words, when the herein disclosure provides a description that is applied to "each" of some particular object and/or component, it should be understood that this is a non-limiting example of various embodiments of the subject innovation, and it should be further understood that, in various other embodiments of the subject innovation, it can be the case that such description applies to fewer than "each" of that particular object and/or component.

Figure 7:
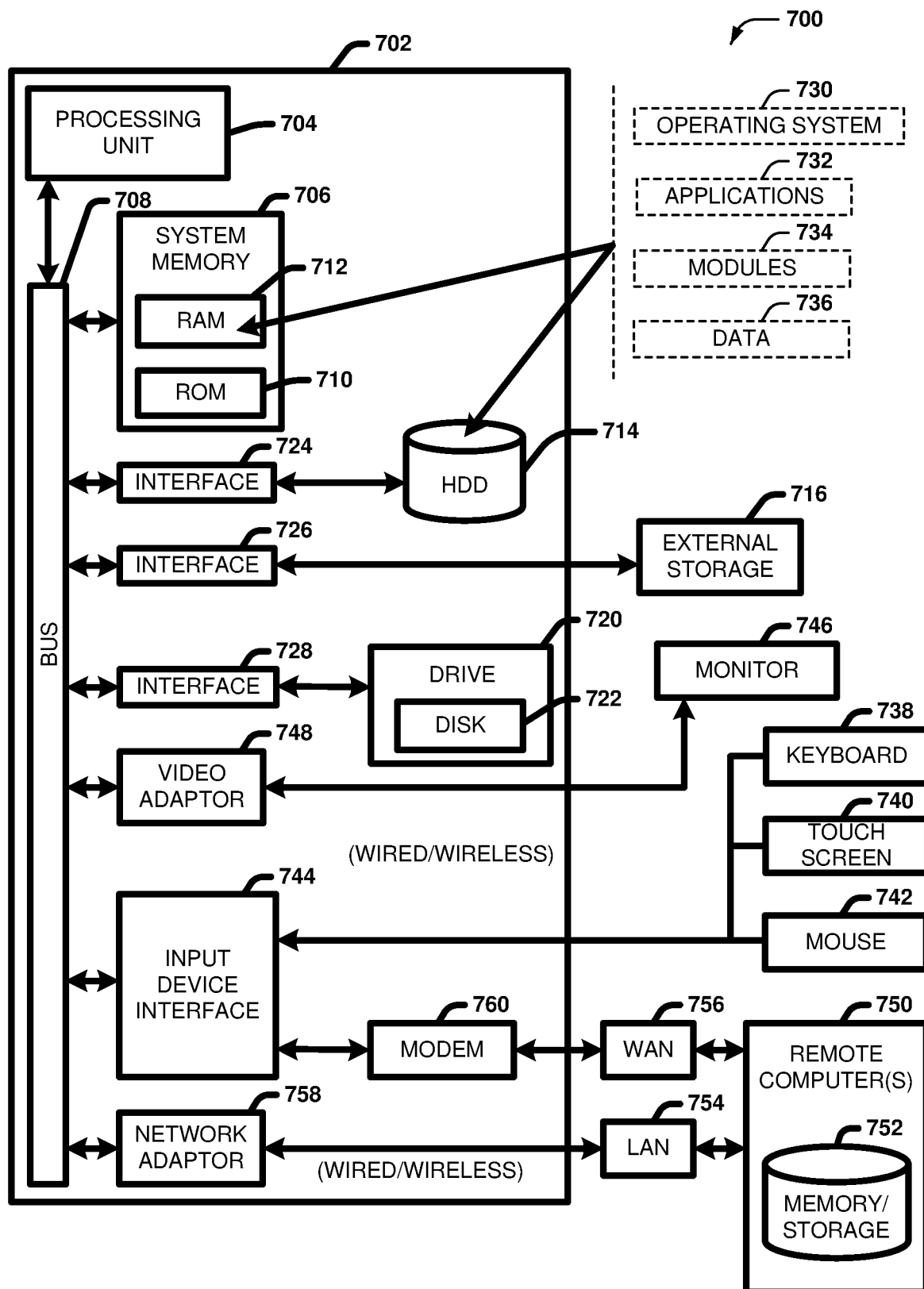
FIG. 7 illustrates a block diagram of an example, non-limiting operating environment in which one or more embodiments described herein can be facilitated.

In order to provide additional context for various embodiments described herein, FIG. 7 and the following discussion are intended to provide a brief, general description of a suitable computing environment 700 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 7, the example environment 700 for implementing various embodiments of the aspects described herein includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures can also be employed as the processing unit 704.

The system bus 708 can be any of several types of bus structure that can further interconnect to a memory bus (with or without a memory controller), a peripheral bus, and a local bus using any of a variety of commercially available bus architectures. The system memory 706 includes ROM 710 and RAM 712. A basic input/output system (BIOS) can be stored in a non-volatile memory such as ROM, erasable programmable read only memory (EPROM), EEPROM, which BIOS contains the basic routines that help to transfer information between elements within the computer 702, such as during startup. The RAM 712 can also include a high-speed RAM such as static RAM for caching data.

The computer 702 further includes an internal hard disk drive (HDD) 714 (e.g., EIDE, SATA), one or more external storage devices 716 (e.g., a magnetic floppy disk drive (FDD) 716, a memory stick or flash drive reader, a memory card reader, etc.) and a drive 720, e.g., such as a solid state drive, an optical disk drive, which can read or write from a disk 722, such as a CD-ROM disc, a DVD, a BD, etc. Alternatively, where a solid state drive is involved, disk 722 would not be included, unless separate. While the internal HDD 714 is illustrated as located within the computer 702, the internal HDD 714 can also be configured for external use in a suitable chassis (not shown). Additionally, while not shown in environment 700, a solid state drive (SSD) could be used in addition to, or in place of, an HDD 714. The HDD 714, external storage device(s) 716 and drive 720 can be connected to the system bus 708 by an HDD interface 724, an external storage interface 726 and a drive interface 728, respectively. The interface 724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 712, including an operating system 730, one or more application programs 732, other program modules 734 and program data 736. All or portions of the operating system, applications, modules, and/or data can also be cached in the RAM 712. The systems and methods described herein can be implemented utilizing various commercially available operating systems or combinations of operating systems.

Computer 702 can optionally comprise emulation technologies. For example, a hypervisor (not shown) or other intermediary can emulate a hardware environment for operating system 730, and the emulated hardware can optionally be different from the hardware illustrated in FIG. 7. In such an embodiment, operating system 730 can comprise one virtual machine (VM) of multiple VMs hosted at computer 702. Furthermore, operating system 730 can provide runtime environments, such as the Java runtime environment or the .NET framework, for applications 732. Runtime environments are consistent execution environments that allow applications 732 to run on any operating system that includes the runtime environment. Similarly, operating system 730 can support containers, and applications 732 can be in the form of containers, which are lightweight, standalone, executable packages of software that include, e.g., code, runtime, system tools, system libraries and settings for an application.

Further, computer 702 can be enable with a security module, such as a trusted processing module (TPM). For instance with a TPM, boot components hash next in time boot components, and wait for a match of results to secured values, before loading a next boot component. This process can take place at any layer in the code execution stack of computer 702, e.g., applied at the application execution level or at the operating system (OS) kernel level, thereby enabling security at any level of code execution.

A user can enter commands and information into the computer 702 through one or more wired/wireless input devices, e.g., a keyboard 738, a touch screen 740, and a pointing device, such as a mouse 742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 704 through an input device interface 744 that can be coupled to the system bus 708, but can be connected by other interfaces, such as a parallel port, an IEEE 1394 serial port, a game port, a USB port, an IR interface, a BLUETOOTH® interface, etc.

A monitor 746 or other type of display device can be also connected to the system bus 708 via an interface, such as a video adapter 748. In addition to the monitor 746, a computer typically includes other peripheral output devices (not shown), such as speakers, printers, etc.

The computer 702 can operate in a networked environment using logical connections via wired and/or wireless communications to one or more remote computers, such as a remote computer(s) 750. The remote computer(s) 750 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 752 is illustrated. The logical connections depicted include wired/wireless connectivity to a local area network (LAN) 754 and/or larger networks, e.g., a wide area network (WAN) 756. Such LAN and WAN networking environments are commonplace in offices and companies, and facilitate enterprise-wide computer networks, such as intranets, all of which can connect to a global communications network, e.g., the Internet.

When used in a LAN networking environment, the computer 702 can be connected to the local network 754 through a wired and/or wireless communication network interface or adapter 758. The adapter 758 can facilitate wired or wireless communication to the LAN 754, which can also include a wireless access point (AP) disposed thereon for communicating with the adapter 758 in a wireless mode.

When used in a WAN networking environment, the computer 702 can include a modem 760 or can be connected to a communications server on the WAN 756 via other means for establishing communications over the WAN 756, such as by way of the Internet. The modem 760, which can be internal or external and a wired or wireless device, can be connected to the system bus 708 via the input device interface 744. In a networked environment, program modules depicted relative to the computer 702 or portions thereof, can be stored in the remote memory/storage device 752. It will be appreciated that the network connections shown are example and other means of establishing a communications link between the computers can be used.

When used in either a LAN or WAN networking environment, the computer 702 can access cloud storage systems or other network-based storage systems in addition to, or in place of, external storage devices 716 as described above, such as but not limited to a network virtual machine providing one or more aspects of storage or processing of information. Generally, a connection between the computer 702 and a cloud storage system can be established over a LAN 754 or WAN 756 e.g., by the adapter 758 or modem 760, respectively. Upon connecting the computer 702 to an associated cloud storage system, the external storage interface 726 can, with the aid of the adapter 758 and/or modem 760, manage storage provided by the cloud storage system as it would other types of external storage. For instance, the external storage interface 726 can be configured to provide access to cloud storage sources as if those sources were physically connected to the computer 702.

The computer 702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 8:
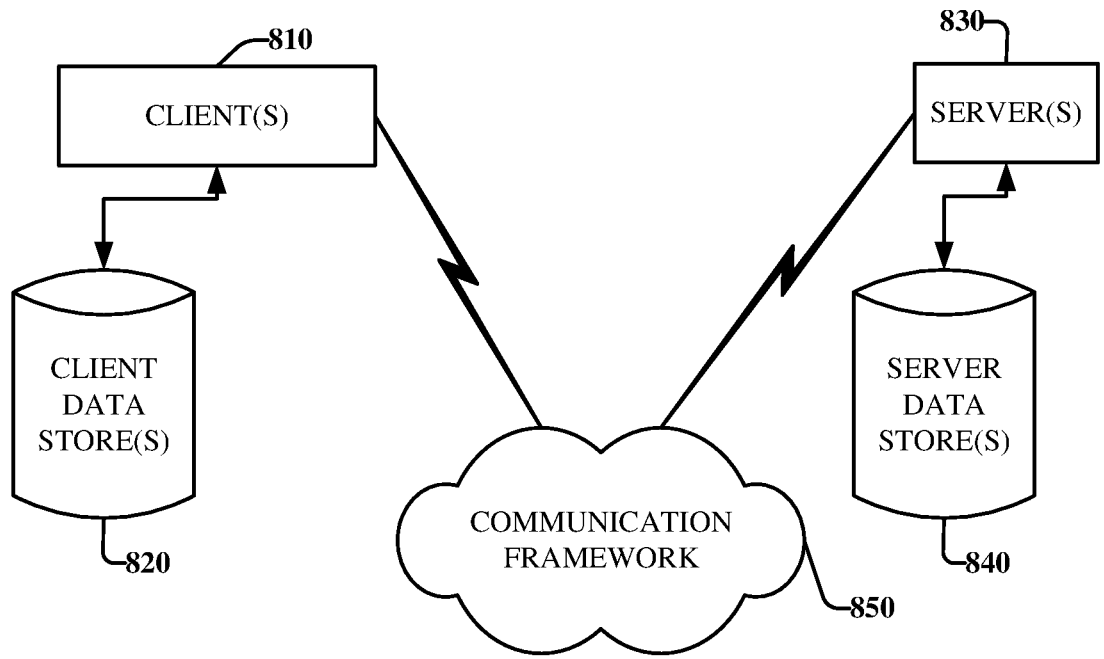
FIG. 8 illustrates an example networking environment operable to execute various implementations described herein.

FIG. 8 is a schematic block diagram of a sample computing environment 800 with which the disclosed subject matter can interact. The sample computing environment 800 includes one or more client(s) 810. The client(s) 810 can be hardware and/or software (e.g., threads, processes, computing devices). The sample computing environment 800 also includes one or more server(s) 830. The server(s) 830 can also be hardware and/or software (e.g., threads, processes, computing devices). The servers 830 can house threads to perform transformations by employing one or more embodiments as described herein, for example. One possible communication between a client 810 and a server 830 can be in the form of a data packet adapted to be transmitted between two or more computer processes. The sample computing environment 800 includes a communication framework 850 that can be employed to facilitate communications between the client(s) 810 and the server(s) 830. The client(s) 810 are operably connected to one or more client data store(s) 820 that can be employed to store information local to the client(s) 810. Similarly, the server(s) 830 are operably connected to one or more server data store(s) 840 that can be employed to store information local to the servers 830.

Various embodiments described herein may be a system, a method, an apparatus and/or a computer program product at any possible technical detail level of integration. The computer program product can include a computer readable storage medium (or media) having computer readable program instructions thereon for causing a processor to carry out aspects of various embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments described herein can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of various embodiments described herein.

Aspects of various embodiments are described herein with reference to flowchart illustrations and/or block diagrams of methods, apparatus (systems), and computer program products according to various embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments described herein. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system, comprising:
a processor that executes computer-executable instructions stored in a computer-readable memory, which causes the computer system to perform operations comprising:
determining that a web browser is performing an electronic transaction checkout on a merchant frontend website;
causing the merchant frontend website to instruct the web browser to transmit a validation request to a merchant backend server, wherein the validation request identifies a coupon code and requests that the merchant backend server determine whether the coupon code is applicable to the electronic transaction checkout;
causing the web browser to insert into or wrap around the validation request a proxy object, such that the web browser transmits both the validation request and the proxy object to the merchant backend server for execution, wherein the proxy object fetches, during execution of the validation request by the merchant backend server, an execution status of the validation request;
receiving, from the proxy object, the execution status of the validation request; and
initiating one or more electronic actions based on the execution status.

2. The computer system of claim 1, wherein the one or more electronic actions comprise:
when the execution status indicates that the validation request has been fully executed by the merchant backend server and that the merchant backend server has determined that the coupon code is not applicable to the electronic transaction checkout, causing the merchant frontend website to instruct the web browser to transmit another validation request to the merchant backend server, wherein the another validation request identifies another coupon code and requests that the merchant backend server determine whether the another coupon code is applicable to the electronic transaction checkout.

3. The computer system of claim 2, wherein the one or more electronic actions further comprise:
when the execution status indicates that the validation request has not yet been fully executed by the merchant backend server, refraining from causing the merchant frontend website to instruct the web browser to transmit the another validation request to the merchant backend server.

4. The computer system of claim 3, wherein the one or more electronic actions further comprise:
when the execution status indicates that the validation request has been fully executed by the merchant backend server and that the merchant backend server has determined that the coupon code is applicable to the electronic transaction checkout, facilitating the electronic transaction checkout according to the coupon code.

5. The computer system of claim 2, wherein the operations further comprise:
identifying the coupon code based on the electronic transaction checkout.

6. The computer system of claim 1, wherein the proxy object periodically fetches the execution status of the validation request.

7. The computer system of claim 1, wherein the validation request is an HTTP request, and wherein the proxy object is JavaScript code that is inserted into or wrapped around a body of the HTTP request.

8. A computer-implemented method, comprising:
determining, by a computer system comprising a processor, that a web browser is performing an electronic transaction checkout on a merchant frontend website;
identifying, by the computer system, a first coupon code and a second coupon code based on the electronic transaction checkout, wherein the first coupon code represents a greater discount than the second coupon code;
causing, by the computer system, the merchant frontend website to instruct the web browser to transmit a first validation request to a merchant backend server, wherein the first validation request identifies the first coupon code and requests that the merchant backend server determine whether the first coupon code is applicable to the electronic transaction checkout;
causing, by the computer system, the web browser to insert into or wrap around the first validation request a first proxy object, such that the web browser transmits both the first validation request and the first proxy object to the merchant backend server for execution, wherein the first proxy object fetches, during execution of the first validation request by the merchant backend server, a first execution status of the first validation request;
receiving, by the computer system and from the first proxy object, the first execution status of the first validation request; and
initiating, by the computer system, one or more first electronic actions based on the first execution status.

9. The computer-implemented method of claim 8, wherein the one or more first electronic actions comprise:
when the first execution status indicates that the first validation request has not yet been fully executed by the merchant backend server, preventing, by the computer system, the merchant frontend website from instructing the web browser to transmit a second validation request to the merchant backend server, wherein the second validation request identifies the second coupon code and requests that the merchant backend server determine whether the second coupon code is applicable to the electronic transaction checkout.

10. The computer-implemented method of claim 9, wherein the one or more first electronic actions further comprise:
when the first execution status indicates that the first validation request has been fully executed by the merchant backend server and that the merchant backend server has determined that the first coupon code is applicable to the electronic transaction checkout, facilitating the electronic transaction checkout according to the first coupon code.

11. The computer-implemented method of claim 10, wherein the one or more first electronic actions further comprise:
when the first execution status indicates that the first validation request has been fully executed by the merchant backend server and that the merchant backend server has determined that the first coupon code is not applicable to the electronic transaction checkout, causing, by the computer system, the merchant frontend website to instruct the web browser to transmit the second validation request to the merchant backend server;

causing, by the computer system, the web browser to insert into or wrap around the second validation request a second proxy object, such that the web browser transmits both the second validation request and the second proxy object to the merchant backend server for execution, wherein the second proxy object fetches, during execution of the second validation request by the merchant backend server, a second execution status of the second validation request;

receiving, by the computer system and from the second proxy object, the second execution status of the second validation request; and initiating, by the computer system, one or more second electronic actions based on the second execution status.

12. The computer-implemented method of claim 11, wherein the one or more second electronic actions comprise:

when the second execution status indicates that the second validation request has been fully executed by the merchant backend server and that the merchant backend server has determined that the second coupon code is applicable to the electronic transaction checkout, facilitating the electronic transaction checkout according to the second coupon code.

13. The computer-implemented method of claim 11, wherein the one or more second electronic actions comprise:

when the second execution status indicates that the second validation request has been fully executed by the merchant backend server and that the merchant backend server has determined that the second coupon code is not applicable to the electronic transaction checkout, identifying, by the computer system, a third coupon code based on the electronic transaction checkout or transmitting, by the computer system, a message to the web browser indicating that no coupon code applicable to the electronic transaction checkout could be identified.

14. The computer-implemented method of claim 11, wherein the first proxy object continually fetches the first execution status, and wherein the second proxy object continually fetches the second execution status.

15. A computer program product for facilitating proxy objects for tracking processing of electronic coupon codes, the computer program product comprising a non-transitory computer-readable storage medium having program instructions embodied therewith, the program instructions executable by a processor to cause a computer system to perform operations comprising:

determining that a web browser is performing an electronic transaction checkout on a merchant frontend website;

accessing a plurality of coupon codes based on the electronic transaction checkout; and iterating through the plurality of coupon codes, wherein, for each given coupon code in the plurality of coupon codes, the computer system:

causes the merchant frontend website to instruct the web browser to transmit a validation request to a merchant backend server, wherein the validation request identifies the given coupon code and requests that the merchant backend server determine whether the given coupon code is applicable to the electronic transaction checkout;

causes the web browser to insert into or wrap around the validation request a proxy object, such that the web browser transmits both the validation request and the proxy object to the merchant backend server for execution, wherein the proxy object fetches, during execution of the validation request by the merchant backend server, an execution status of the validation request; and waits to iterate to a next coupon code in the plurality of coupon codes until after the computer system receives the execution status from the proxy object.

16. The computer program product of claim 15, wherein, for each given coupon code in the plurality of coupon codes, the computer system:

receives the execution status from the proxy object; and determines whether to iterate to the next coupon code based on the execution status.

17. The computer program product of claim 16, wherein, for each given coupon code in the plurality of coupon codes, the computer system:

iterates to the next coupon code when the execution status indicates that the validation request has been fully executed by the merchant backend server and that the merchant backend server has determined that the given coupon code is not applicable to the electronic transaction checkout.

18. The computer program product of claim 16, wherein, for each given coupon code in the plurality of coupon codes, the computer system:

refrains from iterating to the next coupon code when the execution status indicates that the validation request has not yet been fully executed by the merchant backend server.

19. The computer program product of claim 15, wherein the computer system iterates through the plurality of coupon codes in order of decreasing discount.

20. The computer program product of claim 15, wherein the validation request is an HTTP request, and wherein the proxy object is JavaScript code that is inserted into or wrapped around a body of the HTTP request.

* * * * *